Feb. 3, 1959    M. R. FENSKE ET AL    2,872,472
OXIDATION OF ORGANIC COMPOUNDS
Filed Nov. 21, 1955    5 Sheets-Sheet 1

FIGURE-1

Merrell R. Fenske   Inventors
Jennings H. Jones

By *Peter H. Smolka*   Attorney

Merrell R. Fenske
Jennings H. Jones   Inventors

United States Patent Office 2,872,472
Patented Feb. 3, 1959

2,872,472

OXIDATION OF ORGANIC COMPOUNDS

Merrell R. Fenske and Jennings H. Jones, State College, Pa., assignors to Esso Research and Engineering Company, a corporation of Delaware Application November 21, 1955, Serial No. 547,957

10 Claims. (Cl. 260—451)

This invention is concerned with the production of new and valuable chemicals by vapor phase oxidation of organic compounds, and particularly involves controlling the temperature of the reaction by flowing or "raining" a stream of highly dispersed particulate solids through the reaction zone in intimate and direct contact with the gaseous reagents. One of the important embodiments of this invention deals especially with controlled oxidation of gasified hydrocarbons where substantial amounts of oxygen are used to make oxy-compounds, part of which have a carbon skeleton smaller than the hydrocarbon feed, and part have the same or a substantially greater number of carbon atoms than the feed.

This application is a continuation-in-part of Serial No. 403,413, filed January 11, 1954, now abandoned, which in turn is related to Serial No. 309,144, filed September 11, 1952, now Patent No. 2,725,244.

In the accompanying drawing.

The feed may be normally gaseous, or an organic compound vaporizable under the reaction conditions, having at least 30 weight percent of the carbon atoms in the molecule in the form of methylenic groups. For purposes of this description the expression "methylenic groups" is used in a generic sense and will be understood to cover methylenic groups proper, —$CH_2$—, and methyl groups, —$CH_3$, both. The compounds useful as feed herein may be alcohols, ketones, amines, ethers, esters, hydrocarbons, or mixtures of the foregoing, provided that they have the specified proportion of methylenic groups. For example, in the case of hydrocarbons the feed may be butane, pentane, heptane, decanes, other chain or cyclic saturates, olefins, or naphthenes ranging in normal boiling point from below —20° to 450° C. and higher and having up to 18 carbon atoms. Aliphatic hydrocarbons containing about 5 to 10 or more carbon atoms in a straight chain, or naphthenes possessing a five- or six-membered ring, are particularly preferred. Relatively low molecular weight, and increasing branchiness both tend to reduce the reactivity of a hydrocarbon molecule and consequently, for instance, the oxidation of highly branched hydrocarbons such as 2,2,4-trimethyl pentane requires somewhat more drastic reaction conditions, e. g. pressures of at least about 2 to 5 atmospheres, whereas atmospheric pressure is satisfactory for oxidizing normal alkanes. Aromatics without substantial chain or naphthenic appendages, such as benzene, toluene, the xylenes, and other highly nucleated aromatics, such as naphthalene, are relatively inert and are normally not good feed stocks for carrying out this type of oxidation. However, they may be present in feed mixtures with the aforementioned other hydrocarbons.

Other eminently suitable feeds include aliphatic alcohols, especially $C_4$ to $C_{10}$ and higher alcohols such as butanol-1, octanol-1, tridecyl alcohol (such as that produced by oxonation of $C_{12}$ olenfins), etc.; also ketones of a similar range of carbon atoms, e. g. heptanone-2; and so forth.

If the feed is easily condensable or liquefiable, such as when oxidizing substances boiling above —20° C., the reaction products usually comprise three phases: a gas or non-condensable portion, a liquid aqueous phase, and a liquid organic phase.

A high degree of conversion, e. g. at least 25 to 30% per pass, is an important feature of this invention. This high hydrocarbon conversion is accomplished by injecting oxygen, usually at a multiplicity of points, into the reaction zone in total amounts exceeding one mole per mole of oxidizable feed, or by partial recycling of the conversion products. However, excessive oxidation or degradation into oxides of carbon is prevented or minimized by the heat control technique of this invention which assures a high rate of heat removal, short contact time, and uniform flow without back mixing or internal recycling such as occurs in dense fluidized beds. Dense beds of fluidized solids are not useful as an environment for non-catalytic vapor phase oxidation since the large amount of surface tends to arrest the desired reaction.

The recycling of the products can be operated in either of two ways: (1) the organic layer of the reaction product can be sent to a separations step wherein the bulk of the products formed are separated from unchanged feed stock, which is recycled; or (2) the organic layer reaction products can be recycled without separation. In this latter case, more water layer chemicals are formed, since those soluble or extractable by water are not recycled due to their removal by dissolution in the water layer or by a water wash. Also, in this second case the buildup of oxy-compounds in the organic layer is usually greater than if the operations are once-through. Thus the organic layer separation step can be supplied with a feed richer in oxy-compounds than if the reaction were only once-through.

The oxidant may be oxygen, air, enriched air, or other oxygen-containing gas, such as a mixture of oxygen and steam. The various vaporous feed stocks oxidize with different rates, and the temperatures to initiate reaction are different, but easy to determine. If the reaction tends to be too fast or violent, it is frequently better to use an oxygen-diluted oxidant such as air, or oxygen-steam mixtures. The size of the gaseous recovery system, if used, and the ease of gaseous products recovery are dependent, naturally, on the amounts of gaseous inerts such as nitrogen, to be handled.

The pressures used range from about 0 to 5 p. s. i. g. to about 100 or 200 p. s. i. g. or in the range of 0.01 to 15.0 atmospheres. The pressure selected depends on the reactivity of the material being oxidized as indicated above, and on the desired extent of gas recovery. For example, it may or may not be desirable to recover such lower olefins, aldehydes, and oxides of carbon as may be present in the gaseous products. Pressure on the reactor helps the recovery of such gases, since the effluent gases then do not have to be separately compressed for the recovery step.

The reaction temperatures used range from about 300° to 475° C. or to about 500° C., usually about 330° to 430° C. Too low a reactor temperature stops the reaction; too high a temperature may also adversely affect the preferred formation of variable oxy-compounds, instead favoring "burning" reactions, i. e., the production of increasing amounts of carbon dioxide, carbon monoxide, and water.

The actual time required to react oxygen with the vaporous feed is short, usually a few seconds or fraction of a second. Since the oxy-compounds formed are usually stable thermally for at least a few seconds at temperatures of 350° to 450° C., the time in the reactor may range from a few seconds upward. The object is to control the temperature within tolerable limits and to remove the reaction products rapidly, consistent with operational problems and good engineering design.

The solids used in the reactor to control the reaction and pick up the reaction heat may be silicious or aluminiferous materials such as Ottawa sand, glass beads, spent clays, quartz, fused alumina, coke, and the like. These solids are preferably inert toward the feed stock, i. e., they are not needed as catalysts to initiate the oxidation reaction. Their purpose is to moderate the reaction zone with respect to temperature, to prevent the formation of hot spots, or excessive localized temperatures, to slow down and spread out the active reaction zone, and to assimilate the heat of reaction so that this heat can, in turn, be removed from the solids in another operation. In general, their size and shape are such that they can be fluidized, but their particle size should not be so small that they are readily entrained in the gases, or be such that they are not amenable to the separation from the reaction gases by conventional solid-gas separators, such as cyclones. They should also resist attrition. The solids may contain heavy metals and heavy metal oxides that are oxidizable and reducible, such as silver, copper, platinum, chromium, iron, or alumina, or the oxides of tungsten and molybdenum. However, these are not needed to carry out the present type of reaction. The size of the solid particles usually ranges from about 50 to 800 microns, and particles of 100 to 300 microns show good fluidizing and flow features, and low entrainment in the gas. The properties of some suitable solids are listed in Table 1.

Figure 1:
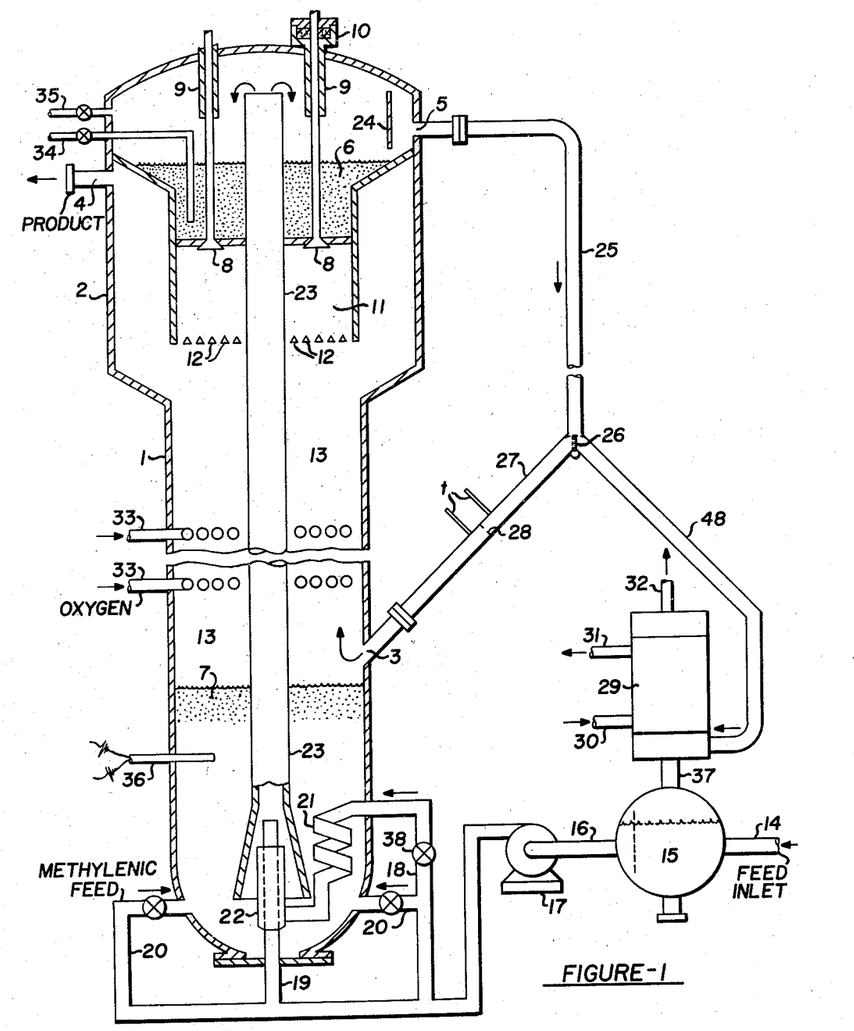
Figures 1, 3 and 5 illustrate alternative embodiments of apparatus suitable for carrying out vapor phase reactions in accordance with this invention.

These falling solids impinge on grid 12 which serves to break up clusters of the solids and disperse them still more so they are able to "rain" or fall in a highly dispersed, uniformly distributed manner down through reaction space 13. The upward linear gas velocity in the reaction space is desirably in the range of about 0.5 to 5 ft./sec. and the solids occupy about 1 to 10% of the total volume of the reaction space proper. Higher solids concentrations tend to slow down the reaction and promote $CO_2$ formation. The solids collect at the bottom of the reactor to form dense bed 7.

Normal hexane, or other material to be oxidized, enters as a liquid through feed line 14, flows through tank 15, and out via line 16 and metering pump 17, for introduction into reaction chamber 1, via lines 18, 19, and 20. The feed flowing through lines 19 and 20 is introduced into the reactor essentially as a liquid, near or at its boiling point. That portion of the feed flowing through line 18 becomes vaporized by coil 21. Liquid and vaporized material passing respectively through line 19 and coil 21 flows in any desirable proportion through nozzle 22 and thence upward through solids lift pipe 23. Pipe 23 is desirably flared at the bottom to facilitate the inflow of fluidized solids at its base. The feed stock emerging from nozzle 22, partly in liquid and partly in vapor form, lifts the hot solids from bed 7 up through pipe 23 while the liquid feed normally becomes vaporized in the process.

At the top of pipe 23 the solids are disengaged from the lift vapors. They fall downward to constitute bed 6. The vapors emerging from the top of pipe 23 flow around baffle 24 and out through opening 5. A high degree of separation efficiency is usually not necessary since both the solids and the vapors eventually pass from the top of the reactor into reaction space 13. However, a cyclone may be used if desired, to separate entrained solids from the vapors leaving through pipe 5.

The hot fluidized solids entering the flared base of pipe 23 vaporize any liquid feed introduced via line 19. In this way the solids are cooled and the necessary vapors are generated to propel the solids up through lift pipe

TABLE 1
Physical properties of granular solids

| Material | Average Particle Diameter (Microns) | Particle Density, (Lb./Ft.³) | Settled Bed Density, (Lb./Ft.³) | Fraction Free Space (Settled Bed) | Free Fall Velocity,[1] (Ft./Sec.) | Fluidization Velocity,[2] (Ft./Sec.) | Specific Heat of Particle,[3] B.t.u./Lb., °F. |
|---|---|---|---|---|---|---|---|
| Carbon Powder | 35 | 63 | 34 | 0.47 | 0.12 | Approx. ½₀ of the Free Fall Velocity. | 0.18 |
| Microspheres | 62 | 90 | 49 | 0.46 | 0.5 | | 0.23 |
| Glass Spheres | 104 | 170 | 104 | 0.38 | 2.0 | | 0.20 |
| Alumina ($Al_2O_3$) | 125 | 230 | 114 | 0.51 | 3.0 | | 0.20 |
| Glass Spheres [3] | 308 | 176 | 110 | 0.38 | 8.0 | | 0.18 |
| Carbon Granules | 550 | 63 | 32 | 0.49 | 7.5 | | 0.18 |
| Glass Spheres | 600 | 176 | 110 | 0.38 | 15 | | 0.20 |
| Carbon Granules | 1,200 to 2,400 | 63 | 33 | 0.48 | 21 | | 0.18 |

[1] At 70° F. and 750 mm. Hg in air.
[2] These velocities are near the minimum values required for incipient fluidization with air at 70° F. and 750 mm. Hg.
[3] 20° C. to 100° C.

The apparatus for carrying out these reactions may take various forms. A reactor particularly well suited for these vapor phase oxidations is shown in Figure 1. It consists of a vertical cylindrical shell 1 and an expanded top 2, fabricated to withstand temperatures up to about 550° C. and pressures to about 200 or 400 p. s. i. It is provided with openings 3, 4, and 5. In the upper part of the expanded section 2 is a fluidized, or partially fluidized bed 6 of sand or similar inert solids, and a similar bed of the same solids exists at the bottom, 7. Solids in upper bed 6 are metered by one or more valves 8, which are slidable in valve guides 9 and sealed by stuffing boxes 10. The solids thus can be fed and flow downward, under essentially free-fall conditions, into space 11.

23. Nozzle 22 serves to aspirate the solids into the base of pipe 23.

Vapors leaving lift gas outlet 5 pass down through pipe 25 to valve 26. This diverts part of the vapors into line 27 which connects with feed inlet opening 3, and part through line 48.

Vapors in line 48 may flow into heat exchanger 29 where they are condensed by a coolant, such as water, entering at 30, and leaving at 31. Inerts, or any non-condensable gases, are bled off through line 32. Condensate flows downward through pipe 37 to tank 15 where it is mixed with fresh liquid feed entering line 14.

The vapors to be oxidized flow through line 27 and orifice meter 28, which communicates with pressure taps

*t*. The function of the flow measuring device 28 will be described later. These vapors enter the reaction chamber vessel 1, at inlet 3 and flow upward through reaction space 13. In this way they flow countercurrent to the descending, dispersed stream or "rain" of particulate solids issuing around valves 8 and passing downward through grid 12. The function of these solids during their fall through vessel 1 and reaction space 13 is to pick up rapidly the reaction heat generated in space 13.

Oxygen enters pipes 33 which are placed from 1 to 5 feet apart along the vertical length of reaction zone 13. These pipes comprise substantially uniplanar coils, and have a large number of holes or slots on their underside so the oxygen can be distributed uniformly throughout the whole cross section of vessel 1. These pipes or coils 33 also serve to redisperse and redistribute the descending, dispersed solids. Thus, the solids in their flow from bed 6 to bed 7 are falling in part under free-fall, and in part, under restricted flow conditions.

At or near oxygen inlet coils 33 the reaction of the oxygen and vaporous feed occurs. This generally is a fast reaction and is complete in a few seconds or less. The heat thereby liberated has to be assimilated, or reaction temperatures rise to intolerable levels. The raining stream of the relatively cool solids accomplishes this quickly because of the intimate contact with the entire body of reacting gases.

Multiple oxygen injection is used to control the reaction further. That is, the oxygen is added in relatively small increments so it can react, and the reaction heat be absorbed by the solids, before the next increment of oxygen is added. By thus keeping the local mole ratio of oxygen to hydrocarbon between about 0.1 and 0.5, overall mole ratios of oxygen to feed substantially greater than 1 can be employed.

The vaporous reaction products flow upward through enlarged section 2 where the gas velocity is decreased to allow entrained solids to drop back into 1. The vapors then leave via line 4 to a recovery system such as that shown in Figure 2.

The following description relates to the control of the oxygen, the feed stock, the solids streams, and of the reaction heat.

The solids in upper bed 6 desirably are at as low a temperature as possible to facilitate rapid cooling of the gases, but usually hot enough to initiate the oxygen-feed reaction in reaction space 13. Actually, of course, the solids in bed 6 may be below initiation temperature, e. g. at 200° or 250° C., as long as they are heated up to initiation temperature by the time they reach the active oxidation zone, or as long as the initiation temperature is reached independently of the solids, e. g. by pre-heating the gaseous reagents. However, bed 6 should not be more than about 30° C. above this initiation temperature, for then, on passing through reaction zone 13 the solids would acquire excessive temperatures that cause some of the reaction products to decompose. The temperature in bed 6 is usually in the range of 280° to 400° or 450° C., e. g. 280° C. for n-decane, 300° C. for n-heptane, etc. From about 5 to 100, but preferably 10 to 40 pounds of solids flow downward countercurrently to the ascending gaseous feed-oxygen stream per pound of feed stock introduced at 3. This ratio depends on the nature of the feed stock being oxidized, the speed of the reaction, and the proportion of oxygen to be reacted with the feed stock, as in the range of 2 to 200 pounds of solids per pound of vaporous reaction mixture.

The level of bed 6 may be controlled and kept substantially fixed by sensing pipes 34 and 35. A small amount of inert gas is introduced continuously into these pipes. The difference in the gas pressure between pipes 34 and 35 is proportional to the depth of solids in bed 6. If the bed exceeds the desired depth, the increased gas pressure in pipe 34 operates a pilot valve which in turn operates a conventional pneumatic or hydraulic cylinder (not shown) attached to the upper end of valves 8 to move them up and down.

The temperatures of lower bed 7 is measured by thermocouple 36. This thermocouple controls the rate at which pump 17 pumps feed stock out of vessel 15 and into reactor 1. Usually bed 7 is at a temperature that is 25° to 80° C. above that of bed 6. If bed 7 rises in temperature above the desired control point, more liquid feed stock is introduced into nozzle 22. More vaporization of this feed stock cools bed 7 and transports more solids to upper bed 6. This serves to increase the circulation rate of solids per unit time that rain down through reaction zone 13.

Orifice 28 in line 27 measures and controls the rate at which the feed flows into opening 3 and thence into oxidation space 13. This is a standard type flow meter whose pressure taps *t* communicate with a suitable control instrument (not shown) which positions valve 26. Feed vapors in excess of that required by flow meter 28 are diverted by valve 26 and line 48 to condenser 29. Usually the ratio of feed vapors flowing in line 27 to that in line 48 is 1 or less.

The oxygen fed to coils 33 is likewise controlled to comprise the desired oxygen-to-feed molal ratio. Usually this ratio is in the range of 0.5 to 2.5 overall, and about 0.1 to 0.5 in each incremental stage.

The temperature of bed 6 is controlled by the proportions of feed and solids flowing through lift pipe 23, by the proportion of liquid feed flowing through line 19 and vapor flowing through vaporizer 21, and by the temperature of bed 7. Valve 38 apportions the flow through vaporizer 21. If desired, a heat transfer coil may be positioned in bed 6 or bed 7 or both to provide additional heating or cooling. Such cooling may be particularly appropriate when a normally gaseous feed is being treated.

Figure 2:
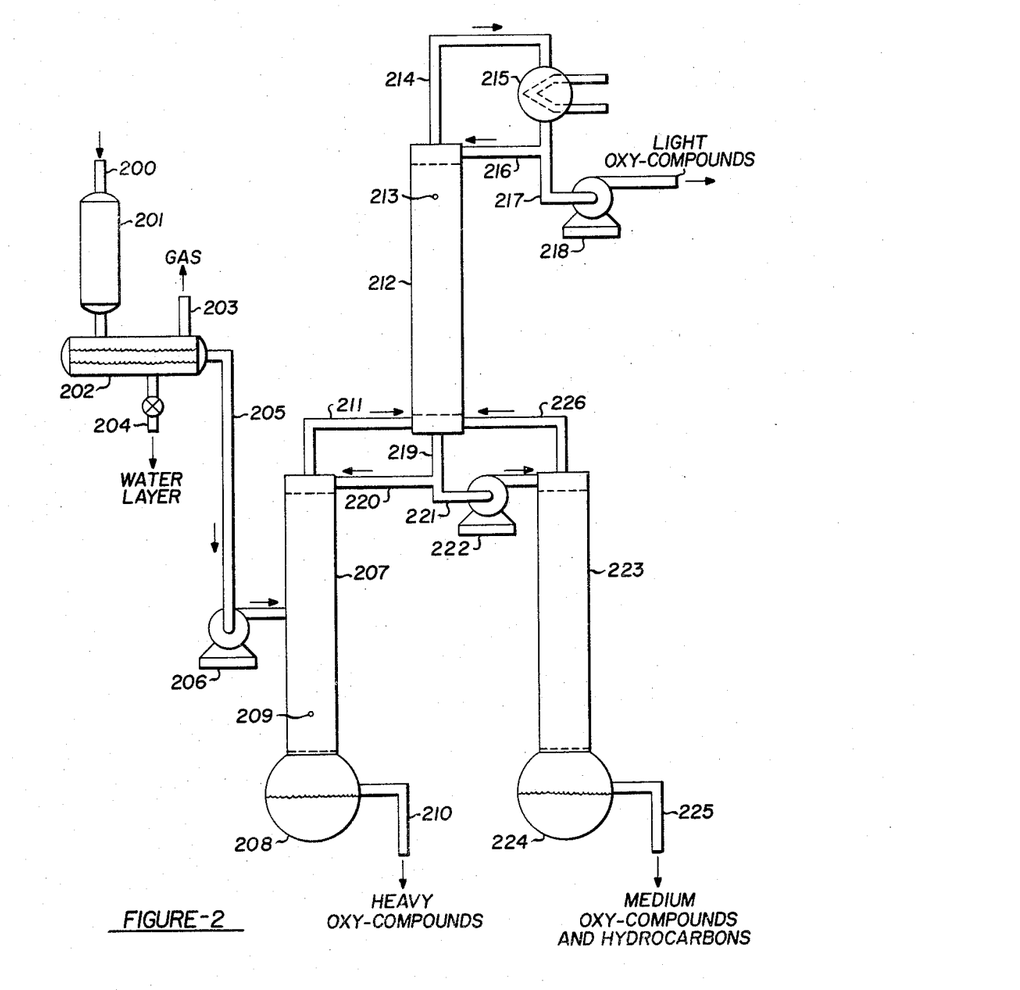
Figure 2 is illustrative of a system suitable for product recovery when a normally liquid hydrocarbon is oxidized pursuant to this invention, permitting separation of oxy-compounds from unconverted feed and recycling of the latter to the oxidation reaction.

One type of recovery system suitable for use with a normally liquid hydrocarbon feed, and the means whereby the oxy-compounds are separated from unreacted hydrocarbons, is shown in Figure 2. Here the vapors leaving line 4 of Figure 1, enter via line 200 of Figure 2, into a condenser 201, usually water cooled or refrigerated. Here the condensables are liquefied and form a liquid water layer and a liquid hydrocarbon layer. Non-condensables pass out through line 203. These may be processed further to obtain valuable gaseous compounds such as carbon monoxide, ethylene, and propylene.

Settler 202 separates the water and hydrocarbon layers, the former being withdrawn for further processing via line 204. The hydrocarbon layer leaves through line 205, passes through feed metering pump 206 and then into fractional distillation column 207. This is provided with the usual reboiler 208. A thermocouple or other temperature sensitive device 209 is located in column 207 at a point between the reboiler and the feed entry. As liquid accumulates in 208 it overflows and leaves via line 210. This constitutes the high boiling oxy-compound product.

The vapors in column 207, generated in reboiler 208, pass out through line 211 into the base of a second fractional distillation column 212. This column has a thermocouple 213 positioned in its upper part, as shown. The vapors flowing upward in column 212 flow out through line 214 into condenser 215, where they are condensed to liquid. Part of this liquid is returned via line 216 to serve as reflux for column 212. The remainder flows out through line 217 and metering pump 218 to comprise the low boiling oxy-compound product.

The liquid leaving the base of distillation column 212 passes out through line 219, where part is sent to the top of column 207 via line 220 and part to the top of column 223, via line 221, and metering pump 222. This liquid descends column 223 and ultimately reaches reboiler 224 where the vapors for column 223 are generated. Excess liquid, i. e., the part not vaporized in the reboiler, overflows and leaves via line 225 to comprise the intermediate boiling product portion. This intermediate portion is normally rich in hydrocarbons, and can be recycled back to reactor 1 of Figure 1, via feed line 14 of Figure 1.

The vapors generated in reboiler 224 and which pass up through column 223 leave the column via line 226 to enter the base of column 212 as shown.

Thermocouples 209 and 213 may actuate conventional recording and controlling devices which in turn may activate pneumatic transmitters capable of controlling the speed of hydraulic transmissions, the latter being driven by electric motors in a manner well known by itself and not shown in the drawing.

The control of the columns to produce high boilers in 208, low boilers in 215, and intermediate boilers in 204, is as follows. If the temperature of couple 209 falls below a predetermined point, at constant reboil heat in 208, the speed of metering pump 222 is increased to withdraw more liquid from line 219, thus raising the control point temperature 209. When the proper temperature is attained at 209, the speed of pump 222 is reduced. Similarly, in column 212, couple 213 is set at the desired control temperature. If this temperature rises too much, indicating intermediate boilers are apt to pass out the top of column 212, the couple 213 operates to reduce the speed of metering pump 218. This produces more reflux liquid in line 216 and this in turn washes the intermediate boilers back down column 212.

The effluent product from line 4 of Figure 1 can be treated in other ways besides fractional distillation as illustrated, to recover a hydrocarbon-rich product for recycle to reactor 1. For example, if the condensed product from condenser 41 has oxy-compounds in it that are readily water soluble, then water scrubbing can be used to remove them from the hydrocarbons. This is useful for hydrocarbon feeds having from 1 to about 6 carbon atoms per molecule. The distillation procedure is useful for hydrocarbon feeds having from about 5 to 16 carbon atoms per molecule.

Adsorption can also be used to obtain an oxy-compound concentrate from the hydrocarbon layer along with a hydrocarbon-rich product suitable for recycle. In this case the hydrocarbon layer in 202 flows via line 205, to adsorption columns (not shown) packed with silica gel or activated alumina, which selectively adsorb the oxy-compounds and do not retain the hydrocarbons. This is a satisfactory procedure, especially for wide-boiling hydrocarbon feeds.

The following examples will illustrate further the nature of the invention, and its advantages in producing valuable compounds from the controlled vapor phase oxidation of substances having a variety of types and molecular weights.

TABLE 2
*Oxidation of normal hexane*

| Run No. | 1 [A] | | 2 [B] | |
|---|---|---|---|---|
| | HC Layer Separated by Distillation and Only Unreacted Hexane Recycled | | HC Layer Recycled | |
| | Pounds of Products Per 100 Lbs. of Hexane | | | |
| | Charged [C] | Reacting [D] | Charged [C] | Reacting [D] |
| Item: | | | | |
| Hexane Converted, pounds | 68 | 100 | 87 | 100 |
| Oxygen Requirement, pounds | 53 | 78 | 71 | 82 |
| Oxygen/Hexane Mole Ratio | | 2.1 | | 2.2 |
| | Products | | | |
| I { Hydrocarbon Layer: | | | | |
| Butene and Acetaldehyde | 5.4 | 7.9 | 4.5 | 5.2 |
| $C_3$ and $C_4$ Carbonyls | 1.3 | 1.9 | | |
| Hexene | 3.2 | 4.7 | 3.2 | 3.7 |
| Hexane, Unreacted | 32.1 | | 13.0 | |
| $C_6$ Epoxides + Higher B. P. Material | 23.0 | 33.8 | 9.3 | 10.7 |
| | 65.0 | 48.3 | 30.0 | 19.6 |
| Water Layer After Hydrogenation: | | | | |
| II  Organic Material, B. P. 60–90° C. (After Hydrogenation) | 22.9 | 33.7 | 45.4 | 52.2 |
| III  Organic Residue, B. P. Above 100° C | 5.2 | 7.7 | 9.8 | 11.2 |
| | 28.1 | 41.4 | 55.2 | 63.4 |
| Alternate Treatment of Water Layer (Distillation): | | | | |
| IV  Organic Material, B. P. 20–90° C | 14.8 | 21.8 | 31.1 | 35.8 |
| V  Other Organic Material, Largely HCHO | 11.0 | 16.2 | 20.0 | 23.0 |
| | 25.8 | 38.0 | 51.1 | 58.8 |
| Non-Condensable Gas: | | | | |
| CO | 17.3 | 25.4 | 26.7 | 30.7 |
| $CO_2$ | 4.6 | 6.8 | 7.4 | 9.5 |
| Olefins (N=2.5) [E] | 5.3 | 7.8 | 8.1 | 9.3 |
| Paraffins (N=1.5) [E] | 3.5 | 5.1 | 5.3 | 6.1 |
| | 30.7 | 45.1 | 47.5 | 54.6 |
| Total Liquid Organic Products (I, II and III) | 93.1 | 89.7 | 85.2 | 83.0 |
| Total Liq. Org. Products (I, II, and III less Hexene) | 89.9 | 85.0 | 82.0 | 79.3 |
| Total Liq. Org. Products Readily Recovered (I and II less Hexene) | 84.7 | 77.3 | 72.2 | 68.1 |
| Total Liq. Org. Products Readily Recovered (Alternate Method I and IV less Hexene) | 76.6 | 65.4 | 57.9 | 51.7 |

[A] Data from a run in which the hydrocarbon layer product from the oxidation was separated by distillation and only the unreacted hexane portion was returned to the reactor for further oxidation.
[B] Data from a run in which the entire hydrocarbon layer product from the oxidation was recycled to the reactor for further oxidation. Only the water layer and gaseous products were separated.
[C] Once-through.
[D] Recycle to extinction.
[E] N=Average number of carbon atoms per mole.

EXAMPLE 1

Table 2 presents data on the oxidation of n-hexane, using equipment substantially as shown in Figure 1. In Run No. 1 in which the hydrocarbon layer product from the oxidation reactor was separated by distillation into (1) material boiling below hexane, (2) unreacted hexane (which was recycled to the reaction zone), and (3) $C_6$-epoxides and higher boiling material, it is to be noted that the $C_6$-epoxides were the predominant products. These compounds consisting mainly of a mixture of 2,5-dimethyltetrahydrofuran, 2-ethyltetrahydrofuran, 2,4-epoxyhexane, and 2,3-epoxyhexane were produced in a quantity of about 33.8 pounds per 100 pounds of hexane reacting. The organic material in the water layer product also contained an additional quantity (about 5 pounds per 100 pounds of hexane reacting) of $C_6$-epoxides.

Other than the $C_6$-epoxides produced in Run No. 1 the remaining liquid oxygenated products consisted mainly of carbonyls, notably formaldehyde, acetaldehyde, propionaldehyde, butyraldehyde, and acetone, together with some alcohols, chiefly methanol.

When the water layer products from the oxidation reactor are hydrogenated (with 5% by weight of Raney nickel catalyst at 50° C. and 1000 p. s. i. g., for example) then all of the carbonyls including the formaldehyde are converted to alcohols. Under such conditions the organic material in the water layer product consists mainly of methyl alcohol, ethyl alcohol, n- and iso-propyl alcohols, some butyl alcohol, some $C_6$-epoxides, together with a small proportion of a water-soluble residue which consists of glycol-type products. The latter products may result (a) from the hydration of certain $C_6$-epoxides present in the water layer, (b) from the hydrogenation of aldehyde polymers, or (c) possibly from the hydrogenation of dialdehydes such as glyoxal which may have been present in the water layer products.

As the data of Table 2 show, the water layer products yield the following materials depending on the method of processing:

[Basis: 100 pounds of hexane reacting]

Direct distillation of water: Pounds
   Organic material B. P. 20° to 90° C., largely $C_2$, $C_3$, and $C_4$ carbonyls plus some methanol, and $C_6$-epoxides _______________________ 21.8
   Other organic material, largely formaldehyde___ 16.2

Water layer after hydrogenation:
   Organic material B. P. 60° to 90° C., largely $C_1$, $C_2$, $C_3$, and $C_4$ alcohols plus some $C_6$-epoxides _______________________ 33.7
   Other organic material, glycols, etc._________ 7.7

In addition to the liquid organic material produced from the oxidation reaction, abundant quantities of carbon monoxide, and light olefin hydrocarbons are by-products of the reaction. The carbon monoxide may be used for preparing valuable chemicals by means of the Oxo process, the Fischer-Tropsch synthesis, or it may be converted to hydrogen by the water-gas shift reaction.

TABLE 3

*Summarized data on the vapor phase oxidation of a variety of hydrocarbon feeds*

[Reaction temperature range 350 to 420° C. Oxidant used=air for pressure experiments; oxygen for all others.]

| Feed | n-Butane | n-Pentane | Isopentane | n-Hexane | n-Hexane | n-Heptane | N-Decane | Cetane | 2,4-Dimethylpentane | 2,3-Dimethylbutane |
|---|---|---|---|---|---|---|---|---|---|---|
| Expt. No. | H-40 | H-45 | H-36 | H-46-48 | H-47 | B-103 | B-114 | 137 | H-22 | H-20 |
| Feed Conversion, Percent. | <47 | 50 | 38 | 47 | 36 | 42 | 50 | 33 | About 25 | About 20 |
| Oxygen Requirement, Lbs./100 Lbs. Feed Reacting. | 117 | 84 | >58 | 76 | 77 | 53 | 42 | 40 | | |
| Oxygen/Feed Mole Ratio. | 1.0 | 0.95 | 0.50 | 0.95 | 0.75 | 0.65 | 0.95 | 0.93 | 0.6 | 0.5 |
| Reaction Pressure, p. s. i. g. | 50 | 0 | 0 | 0 | 0 | 0 | 0 | 0 | 50 | 50 |

| Products | Pounds Per 100 Pounds Of Feed Reacting | | | | | | | | | |
|---|---|---|---|---|---|---|---|---|---|---|
| Hydrocarbon Layer: | | | | | | | | | | |
| Olefins, Lbs. | 11.8 ($C_4$) | 3.9 ($C_4$) / 9.8 ($C_5$) | 15.6 | 6.2 ($C_4$) / 7.3 ($C_6$) | 5.0 ($C_4$) / 10.2 ($C_6$) | 3.6 ($C_4$) / 13.8 ($C_5$, $C_6$, $C_7$) | 12.8 ($C_4$–$C_8$) / 6.5 ($C_{10}$) | 6.6 ($C_4$–$C_{14}$) / 12.9 ($C_{15}$) | 9.0 ($C_7$) | 8.0 ($C_6$) |
| Carbonyls, Lbs. | 1.5 | 6.4 ($C_2$–$C_4$) | 7.8 | 5.7 | 3.9 | 3.6 ($C_2$) / 6.2 ($C_3$ and $C_4$) | 1.8 ($C_2$) | 9.6 ($C_2$–$C_8$+) / 15.6 ($C_{10}$) | 12 ($C_2$–$C_4$) | 25.0 |
| Epoxides, Lbs. | | | | 22.1 | 26.4 | 29.1 | 50.6 | 28.6 | 45.0 | 22.0 |
| Residue, Lbs. | | | | 2.0 | 4.2 | 9.5 | | 3.9 | | |
| Others, Lbs. | | 4.5 (Oxy) | | | | 2.1 | 3.0 | 9.0 | | |
| (Totals) | (13.3) | (23.6) | (23.4) | (43.3) | (49.7) | (67.9) | (75.7) | (86.2) | (66.0) | |
| Water Layer (Direct Distillation): | | | | | | | | | | |
| Carbonyls, Lbs. | 15.7 ($C_2$–$C_4$) | 29.2 | 37.4 | 22.2 | 18.8 | 7.9 ($C_2$ and $C_3$) | 2.6 | 4.3 | 10.0 | |
| Alcohols, Lbs. | 11.6 ($C_1$–$C_2$) | | | | | | | | | |
| Other, Lbs. | | 7.8 | 7.8 | 4.7 | 5.1 | 6.9 | 5.3 | 3.9 | | |
| Formaldehyde, Lbs. | 8.7 | 7.8 | 5.5 | 6.2 | 11.9 | | | | | |
| Residue, Lbs. | 9.1 | | | | | | | | | |
| (Totals) | (45.1) | (44.8) | (50.7) | (33.1) | (35.8) | (14.8) | (7.9) | (8.2) | | |
| Gaseous Products, Lbs.: | | | | | | | | | | |
| CO | 49.0 | 31.8 | 21.5 | 23.0 | 19.1 | 12.1 | 11.3 | 6.0 | | |
| $CO_2$ | 13.8 | 9.4 | 8.3 | 6.8 | 5.6 | 3.9 | 4.1 | 3.0 | | |
| Unsats. (N) | 16.3 (3) | 8.6 (3) | 8.3 (2.5) | 5.8 (2.5) | 7.5 (2.5) | 13.8 (3) | 12.6 | 3.9 (3) | | |
| Sats. (N) | 15.6 (2) | 2.5 (2) | 9.1 (2.5) | 6.0 (2.5) | 8.0 (2.5) | 4.7 (3) | 4.3 | 2.7 (3) | | |
| (Totals) | (94.7) | (51.3) | (47.2) | (41.6) | (40.2) | (34.5) | (32.3) | (15.6) | | |

TABLE 3—Continued

| Feed | 2,2,4-Tri-methyl-pentane | Cyclohexane | Me-Cyclopentane | Me-Cyclohexane | HLVN[A] | HHVN[B] | Iosol 1026[C] | 1-Hexene |
|---|---|---|---|---|---|---|---|---|
| Expt. No. | H-30 | H-49-50 | B-117 | B-116 | B-85 | B-88 | D-36 | H-66 |
| Feed Conversion, Percent. | About 25 | 47 | 35 | 49 | 46 | 45 | 60 | 33 |
| Oxygen Requirement, Lbs./100 Lbs. Feed Reacting. | | 81 | | 53 | 26 | 21 | | |
| Oxygen/Feed Mole Ratio. | 0.57 | 1.0 | 0.45 | 0.78 | 0.74 | 0.78 | 1.1 | 0.67 |
| Reaction Pressure, p. s. i. g. | 50 | 0 | 0 | 0 | 0 | 0 | 0 | 0 |

| Products | Pounds Per 100 Pounds of Feed Reacting | | | | | | | |
|---|---|---|---|---|---|---|---|---|
| Hydrocarbon Layer: | | | | | | | | |
| Olefins, Lbs. | | 2.3 ($C_4$ and $C_5$) / 13.1 (CY-Hexene) | 3.1 ($C_4$ and $C_5$) / 22.3 (Me-CY-Pentenes) | 4.5 ($C_4$–$C_6$) / 10.9 (Me-CY-Hexene) | | | 15.0 | |
| Carbonyls, Lbs. | | 1.6 ($C_2$ and $C_3$) / 3.8 ($C_5$) | 5.6 ($C_2$ and $C_3$) | 10.6 | | | | 10 |
| Epoxides, Lbs. | >40 | 19.8* | 33.6 | 53.3 | | | 45 | |
| Residue, Lbs. | | 5.3 | | | | | | 30 |
| Others, Lbs. | | 2.1 | 3.4 | | | | | |
| (Totals) | | (48.0) | (68.0) | (79.3) | (66.0) | (80.0) | (60.0) | |
| Water Layer (Direct Distillation): | | | | | | | | |
| Carbonyls, Lbs. | | } 12.0 | } 6.2 | } 8.4 | } 8.6 | 3.4 | | 25 |
| Alcohols, Lbs. | | | | | | | | |
| Other, Lbs. | | | | | | | | |
| Formaldehyde, Lbs. | | 4.6 | 5.1 | 5.1 | 5.6 | 3.9 | | 5 |
| Residue, Lbs. | | 11.2 | | | | | | 10 |
| (Totals) | | | (11.3) | (13.5) | (14.2) | (7.3) | (31.6) | |
| Gaseous Products, Lbs.: | | | | | | | | |
| CO | | 33.0 | 15.0 | 18.9 | 16.3 | 11.1 | | 25 |
| $CO_2$ | | 8.6 | 10.7 | 7.4 | 7.2 | 4.9 | | 7 |
| Unsats. (N) | | 5.1 | 3.4 (3) | 5.3 (3) | 7.6 | 6.4 | | 7.5 (2.5) |
| Sats. (N) | | 2.1 | 1.1 (3) | 1.8 (3) | 3.7 | 2.2 | | 2.5 (2.5) |
| (Totals) | | (48.8) | (30.2) | | (34.8) | (24.6) | | |

[A] HLVN=Humble Light Virgin Naphtha ($C_6$–200° F.).
[B] HHVN=Humble Heavy Virgin Naphtha (200–430° F.).
[C] Iosol 1026=Sarnia Light Virgin Naphtha (112–260° F.).
*Contains Some $C_6$-Carbonyls.

TABLE 4

*Summarized data on the vapor phase oxidation of oxygenated feeds*

[Reaction temperature range=330° to 430° C. Oxidant used=oxygen.]

| Feed | n-Hexanol | n-Butanol | Octanol-2 | Heptanone-2 |
|---|---|---|---|---|
| Run No. | H-58 | H-64 | H-62 | H-59 |
| Feed Conversion, percent | 50 | 50 | 50 | 40 |
| Oxygen Requirement, Lbs./100 lbs. Feed Reacting | 40 | 64 | 40 | 51 |
| Oxygen/Feed Mole Ratio | 0.6 | 0.7 | 0.8 | 0.7 |
| Reaction Pressure, p. s. i. g | 0 | 0 | 0 | 0 |

| Products | Pounds Per 100 Pounds of Feed Reacting | | | |
|---|---|---|---|---|
| Organic Layer: | | | | |
| Olefins, Lbs. | 3.2 | | 5.3 ($C_4$–$C_6$) | } 17.0 |
| Carbonyls, Lbs. | 16.4 | 45.0 | 44.7 | |
| Epoxides, Lbs. | >7.5 | | | |
| Residue, Lbs. | 10.0 | 12.0 | 27.7 | 15.5 |
| Others, Lbs. | 19.0 | | 9.9 | 8.4 |
| (Totals) | (56.1) | (57.0) | (87.6) | (40.9) |
| Water Layer (Direct Distil.): | | | | |
| Carbonyls, Lbs. | } 16.6 | } 12.0 | } 10.1 | } 14.1 |
| Alcohols, Lbs. | | | | |
| Residue, Lbs. | 4.0 | 3.0 | 4.6 | 3.0 |
| Other, Lbs. | | | | |
| (Totals) | (20.6) | (15.0) | (14.7) | (17.1) |
| Gaseous Products, Lbs.: | | | | |
| CO | 27.0 | 53.0 | 15.2 | 27.0 |
| $CO_2$ | 7.2 | 12.0 | 5.2 | 6.7 |
| Unsats. (N=2.5) | 5.0 | 12.0 | 3.0 | 5.3 |
| Sats. (N=1.5) | 3.2 | 3.8 | 2.0 | 4.5 |
| (Totals) | (42.4) | (80.8) | (25.4) | (43.5) |

*Footnotes for Tables 3 and 4*

"Carbonyls" refers to the amount of aldehydes and/or ketones found either in the hydrocarbon or water layer products.

"Epoxides" refers to the total amount of tetrahydrofurans and trimethylene- and ethylene-oxide derivatives present in the hydrocarbon layer products. The water layer products also contain varying amounts of epoxides depending on their water solubility.

"Residue" material in the hydrocarbon layer product consists of ketones, alcohols and unknown material boiling above the boiling point of the epoxides. "Residue" in the water layer products refers to water-soluble aldehyde polymers or glycol-type products.

The "N" values for unsaturates and saturates in the gaseous products refer to the average number of carbon atoms per molecule of either the unsaturated or saturated hydrocarbons.

The light olefins may be polymerized to yield a more useful liquid polymer for blending with gasoline, or may be combined with the refinery vapor products stream for normal processing, or converted into chemicals.

When the process is carried out according to Run No. 2 (see Table 2) in which the water layer and gaseous products are separated from the hydrocarbon layer oxidation products and the hydrocarbon layer is recycled to the oxidation step for further reaction, then the major products consist of low molecular weight water-soluble carbonyls. In this case the $C_6$-epoxides are a minor product.

The foregoing description and the data of Table 2 thus demonstrate the manner in which this oxidation process may be used to yield a variety of products. Depending on the conditions and the ratio of oxygen to hydrocarbon employed, the products may be varied from those containing the same carbon content as the feed to low molecular weight liquid oxygenated products or to gaseous products such as the carbon oxides and gaseous hydrocarbons. Further, under mild operating conditions liquid olefins are an important by-product of the oxidation reaction. These olefins consist of a mixture of olefins having the same carbon content as the feed hydrocarbon together with lower molecular weight olefins. The latter olefins are essentially pure alpha olefins—that is, those having a double bond in the terminal position.

The following data illustrate the invention as applied to the oxidation of n-heptane:

| Run No. | 3 | | 4 | |
|---|---|---|---|---|
| | Hydrocarbon Layer Separated by Dist. and Only Unreacted Heptane Recycled | | Entire HC Layer Recycled After Separating Gaseous and Water Layer Products | |
| | Basis: 100 Pounds of n-Heptane | | | |
| | Charged | Reacting | Charged | Reacting |
| Heptane Converted, pounds | 27 | 100 | 68 | 100 |
| Oxygen Requirement, pounds | 10.6 | 39 | 38 | 57 |
| Oxygen/Heptane Mole Ratio | 0.33 | 1.2 | 1.2 | 1.8 |
| Hydrocarbon Layer Oxygenated Compounds, largely $C_7$ epoxides, pounds | 15 | 54 | 27 | 40 |
| Organic Material, B. P. 20°–90° C. in Water Layer (largely aldehydes), pounds | 3 | 11 | 13 | 19 |

The above data show, just as for the case of the hexane experiment, that depending on the conditions of the experiment the reaction products may be directed to give a maximum of low molecular weight, water-soluble, oxygenated compounds or a maximum yield of oxygenated compounds containing about the same number of carbon atoms per molecule as the feed.

EXAMPLE 2

Additional examples illustrative of vapor phase oxidation in this invention are summarized in Tables 3 and 4.

From the data it is to be noted that air was used as the oxidant for all of the runs made under pressure while oxygen was used in all of the other experiments.

The hydrocarbons requiring pressure in order to achieve reaction at moderate temperatures were butane and relatively highly branched hydrocarbons having two or more side chains such as 2,4-dimethylpentane, 2,3-dimethylbutane, and 2,2,4 - trimethylpentane ("isooctane"). All other feeds underwent reaction at atmospheric pressure. It is to be noted that the present invention, due to the moderate temperatures obtainable herein, results in the production of relatively large amounts of valuable epoxides even in the case of the more branched hydrocarbon feeds. In contrast, previously known processes for the oxidation of these hydrocarbons inherently were characterized in excessively high temperature levels or peaks and consequently resulted in only small amounts of epoxide products.

n-Butane, when oxidized, gave as major products a mixture of carbonyls (formaldehyde, acetaldehyde, propionaldehyde, and some acetone) and alcohols (methyl alcohol, ethyl alcohol and some propyl alcohols). However, some tetrahydrofuran (about 2 to 3 pounds per 100 pounds of butane reacting) also was formed.

*Pentanes.*—n-Pentane and isopentane on oxidation gave epoxides as the major products under mild reaction conditions employing low oxygen/hydrocarbon mole ratios. However, under more severe conditions using greater proportions of oxygen, i. e. at $O_2$/HC mole ratios above about 2, the formation of low-molecular weight oxygenated compounds such as carbonyls and alcohols was favored. In general, this tendency of the present process to produce low molecular weight oxygenated organic compound under more severe reaction conditions and oxygenated compounds having the same carbon content as the feed under mild conditions is characteristic of all hydrocarbons.

*n-Hexane.*—The two runs on n-hexane demonstrate once again the manner in which the yield of products is affected by the proportion of oxygen used in the experiment, that is, the oxygen/hydrocarbon mole ratio or, in other words, the degree of conversion. Thus, in run H–47 in which the milder conditions were employed, the yield of $C_6$-epoxides in the hydrocarbon layer portion was relatively high (26.4 pounds per 100 pounds of hexane consumed). On the other hand, in run H–46 in which an oxygen/hexane mole ratio of 0.95 was employed the yield of $C_6$-epoxides appearing in the hydrocarbon layer product amounted to 22.1 pounds per 100 pounds of hexane consumed. Thus, under mild operating conditions the greatest yield of epoxides is achieved. Further, if epoxides are the desired products, then they are best prepared by operating under mild conditions, separating them by distillation, for example, and returning the unreacted hexane to the reaction zone.

n-Heptane on mild oxidation, yields mainly epoxides which consist of a mixture of 2-methyl-5-ethyltetrahydrofuran, 2,4-epoxyheptane, 2-propyltetrahydrofuran, and 3,4-epoxyheptane. If the hydrocarbon layer from the reactor is recycled to the reaction zone for further oxidation and only the gaseous and water layer products are separated, then low molecular weight, water-soluble, oxygenated compounds are the chief products.

n-Decane (Run B–114), upon mild oxidation, yields a mixture of epoxides containing 2-methyl-5-amyltetrahydrofuran, 2-hexyltetrahydrofuran and some $C_{10}$ trimethylene- and ethylene-oxide derivatives. Such a mixture can be isolated readily by means of the combined oxidation-distillation procedure. Silica gel, as an adsorbent for the oxy-compounds, is also suitable.

n-Cetane (Run 137) behaves like other straight chain hydrocarbons and yields epoxyhexadecanes (tetrahydrofuran and trimethylene- and ethylene-oxide derivatives) as the major products.

2,4-dimethylpentane readily reacts with air or oxygen under a pressure of about 50 p. s. i. g. to give a mixture of $C_7$-epoxides as the major products. The chief compound present in this mixture appears to be 2,2,4-trimethyltetrahydrofuran (B. P. 106–107° C. uncorrected; refractive index, $n_D^{20}$, 1.4040). A small proportion of a trimethylene oxide derivative also was present in the products.

2,3-dimethylbutane readily reacts with air or oxygen under moderate pressure (about 50 p. s. i. g.) to give a mixture (about 60:40) of carbonyls and epoxides as the major products. Unlike n-pentane and higher hydrocarbons containing a chain of at least five carbon atoms discussed above, this hydrocarbon does not yield epoxides as a major product but gives carbonyls instead. In this respect the compound resembles n-butane which gives only a small proportion of epoxides. The epoxides resulting from 2,3-dimethylbutane apparently consist chiefly of 2,3-dimethyl-2,3-epoxybutane and 2,3-dimethyl-1,3-epoxybutane.

2,2,4-trimethylpentane under mild oxidation conditions readily reacts with air under moderate pressure (about 50 p. s. i. g.) to give a mixture of epoxides as the predominant products. The use of moderate pressure is essential in attaining a reaction with this hydrocarbon at moderate temperatures, e. g. 350° C.; essentially no reaction occurs at atmospheric pressure below 450° C. At higher temperatures and at atmospheric pressure, reaction slowly begins but, probably due to cracking, gives degradation products rich in isobutylene as the principal products. On the other hand, at moderate pressures and temperatures this hydrocarbon behaves much like a higher straight-chain hydrocarbon to give epoxides as the main products. The epoxide portion produced from 2,2,4-trimethylpentane consists essentially of a mixture of 2,2,4,4-tetramethyltetrahydrofuran (B. P. 117 to 120° C. uncorrected, refractive index, $n_D^{20}$, 1.4080) and another epoxide (B. P. 131.5 to 133° C.; refractive index, $n_D^{20}$, 1.4150) which appears to be a mixture of 1-t-butyl-2-methyl trimethylene oxide and 1-t-butyl-2,2-dimethyl ethylene oxide. As the data show, the epoxides may be produced in an amount greater than 40 pounds per 100 pounds of isooctane reacting.

Cyclohexane readily reacts at atmospheric pressure and at moderate temperatures either with air or pure oxygen to give a mixture of 1,2-epoxycyclohexane, n-valeraldehyde, n-hexaldehyde and some 1,4-epoxycyclohexane as the major products. Cyclohexane differs somewhat from other hydrocarbons in that a rather large proportion of n-valeraldehyde and n-hexaldehyde is produced in addition to the epoxy-cyclohexanes.

Methylcyclohexane reacts at atmospheric pressure either with air or oxygen to give a mixture of epoxides as the major products. The epoxide mixture consists of 1-methyl-1,2-epoxycyclohexane and other epoxides believed to be 1-methyl-1,3-epoxycyclohexane and 1-methyl-1,4-epoxycyclohexane. Since neither 1-methyl-2,3-epoxycyclohexane, nor 1-methyl-3,4-epoxycyclohexane are formed to any great extent, it appears that the initial point of attack was at the carbon atom where the tertiary hydrogen was located. Unlike cyclohexane, methylcyclohexane did not yield more than traces of aldehydes containing more than four carbon atoms per molecule.

Methylcyclopentane was similar to methylcyclohexane in its reactivity on oxidation as well as in the products formed. Thus, under mild conditions of oxidation the primary products consisted of epoxymethylcyclopentanes.

*Naphthas.*—In addition to the pure hydrocarbons studied in this work a number of naphthas (Runs B-85, B-88, and D-37) also have been processed. These naphthas reacted either with air or oxygen at atmospheric pressure and at moderate temperatures (330° to 400° C.) to yield a complex mixture of epoxides similar to those resulting from the pure hydrocarbons. These epoxides could be separated from the hydrocarbon layer products, for example, by adsorption on silica gel or the like, by selective solvent extraction, or by a chemical conversion. For instance, the epoxides may be converted to ketones by isomerization, to alcohols by hydrogenation, or to glycols by hydration. The conversion products then can be quite readily separated either by means of one of the procedures mentioned above or even by distillation, since the intervening conversion tends to give products possessing boiling points differing more widely from the naphtha hydrocarbons.

Further, by recycling the naphtha hydrocarbon layer to the reaction zone, and using a greater proportion of oxygen, the products of the reaction may be directed to the production of low molecular weight, water-soluble, oxygenated compounds.

Olefins also undergo oxidation in accordance with the procedure of this invention to yield a mixture of products similar in general characteristics to those formed from saturated or paraffin hydrocarbons. Thus, hexene-1 yields a mixture of $C_6$-epoxides, containing some 2,5-dimethyltetrahydrofuran together with other saturated and unsaturated epoxides, as the major products. In addition, abundant quantities of other valuable products such as acrolein, formaldehyde, acetaldehyde, butyraldehyde and valeraldehyde result. Also, one of the products of the reaction consists of oxygenated compounds containing about 12 carbon atoms per molecule.

Octene-1 and octene-2 behave in a manner similar to that of 1-hexene noted above. Diisobutylene, propylene and U. O. P. type polymers (dimers, trimers, tetramers) of $C_3$-$C_4$ olefins can also be similarly treated.

*n-Hexanol.*—Run H-58 indicates the products produced from n-hexanol on vapor phase oxidation. Including both water layer and organic layer products, the carbonyls constituted one of the main product fractions, being formed in a yield of about 25 lbs. per 100 lbs. of hexanol reacting, and consisted essentially of aldehydes from formaldehyde through n-hexaldehyde; little or no ketones were found. The liquid olefins consisted of butene, pentene, and hexene. The epoxides isolated consisted mainly of a very substantial yield of 2-methyl tetrahydrofuran plus a trace of 1,3-epoxypentane. The residue boiling above hexanol constituted the largest individual product fraction and appeared to consist of epoxyhexanols and perhaps aldehyde dimers, trimers, etc. Small proportions of esters also are present in the products.

*n-Butanol.*—Run H-64 indicates that vapor phase oxidation converted n-butanol mainly to $C_1$ to $C_4$ aldehydes (predominantly n-butyraldehyde of which about 50 to 60 lbs. is formed per 100 lbs. butanol reacting), gaseous products, and a small amount of high boiling residue.

*Octanol-2.*—Run H-62 shows that the major product from the oxidation of octanol-2 was carbonyls—mainly octanone-2.

*Heptanone-2.*—Run H-59 demonstrates that this ketone yields carbonyls ($C_1$ through $C_4$) and oxygenated heptanone (the high boiling residue) as the major products.

EXAMPLE 3

Kerosene or gas oil fractions also are useful feeds. Thus a Kendall $C_{17}$ fraction (Engler 572° to 590° F.) was oxidized at atmospheric pressure and at a temperature between about 330° and 440° C. (Run H-77) to a conversion of about 50 percent using an oxygen/hydrocarbon mole ratio of 0.7. We obtained the following materials.

[Production : Basis 100 pounds of feed reacting]

| | Lbs. |
|---|---|
| Organic layer | >95 |
| Water layer chemicals | 2 |
| Non-condensable gas | 2 |

The liquid organic layer product possessed a pour point of 16° F.; the pour point of the feed was 26° F. A portion of the liquid organic layer product was percolated through silica gel to separate the oxygenated compounds (and aromatics) present. In this manner an oxygenated concentrate amounting to 32 percent by weight of the organic layer was isolated. In addition, an oxygen-free hydrocarbon fraction totaling 67.5 percent by weight of the organic layer product was obtained. The oxygenated concentrate possessed a pour point lower than —80° F.; the hydrocarbon portion had a pour point of 23° F.

The aromatic content of the feed was about 10 percent by volume as determined by the solubility in 98 percent sulfuric acid. Thus, the oxygenated concentrate isolated by means of the silica gel treatment probably consisted of about 70 percent of oxygenated compounds and 30 percent of aromatics.

A portion of the oxygenated concentrate was distilled under vacuum as follows:

| Frac. | Frac. Wt., Grams | Total Wt. Off, G. | Wt. Percent of Charge Distilled | B. P., °C., at 1 mm. of Hg | R. I., $n_D^{20}$ | Carbonyls, G.O./ 100 G. | Wt. Percent As C-17 Ketones In Frac. |
|---|---|---|---|---|---|---|---|
| 1 | 4.9 | 4.9 | 1.6 | Below 70° | 1.4472 | 5.3 | |
| 2 | 28.7 | 33.6 | 11.3 | 70 to 106° | 1.4630 | 4.0 | |
| 3 | 113.2 | 146.8 | 49.4 | 106 to 120° | 1.4913 | 1.5 | 23 |
| 4 | 49.2 | 196.0 | 65.9 | 120° (About 320° C. at Atmos. Press.). | 1.4898 | 1.5 | 23 |
| 5 | 40.0 | 236.0 | 79.4 | 120 to 134° | 1.4841 | 1.9 | 30 |
| 6 | 18.9 | 254.9 | 85.7 | 134 to 156° | 1.4856 | 3.9 | 60 |
| Res | 17.9 | 272.8 | 91.8 | Above 156° | | | |

The major oxygenated compounds present consisted of epoxides (mainly $C_{17}$ tetrahydrofurans) and $C_{17}$ ketones.

The above data demonstrate that vapor phase oxidation offers a procedure for lowering the pour point of kerosene or gas oil fractions. This is of particular importance in refining jet fuels. The oxidation process also may improve the burning qualities, cleanliness, etc. of kerosene, and heating oils.

In addition, a water layer product was formed which contained formaldehyde, acetaldehyde, propionaldehyde, butyraldehyde, isobutyraldehyde, acetone, and methyl alcohol.

By recycling the hydrocarbon layer to the oxidation reactor for further reaction, and separating only the water layer and gaseous products, the reaction may be directed toward the production of low molecular weight, water-soluble, oxygenated compounds.

EXAMPLE 4

The foregoing data have shown that appreciable quantities of carbon monoxide result from the vapor phase oxidation process. When the liquid organic layer product is recycled to extinction to the oxidation zone and only water layer products and gaseous products are removed, then the quantities of carbon monoxide produced become appreciable. This is shown in accompanying Table 5 where a comparison is made with the production of carbon monoxide (as synthesis gas accompanied by an equal molar volume of hydrogen) from natural gas and coal.

As the data of the table show, vapor phase oxidation can be employed in producing appreciable quantities of carbon monoxide in addition to the useful water-soluble oxygenated compounds and light olefins. The carbon monoxide could be combined with hydrogen (from reforming operations, for example) and used as synthesis gas in the Oxo process. Further, it could be made to undergo the water gas shift reaction $$CO + H_2O \longrightarrow CO_2 + H_2$$

to produce hydrogen to be used for the production of ammonia, etc.

While the foregoing data were obtained in the apparatus illustrated in Figure 1, similar results can be obtained in other equipment such as that shown in Figure 3 or 5 described below.

Figure 3:
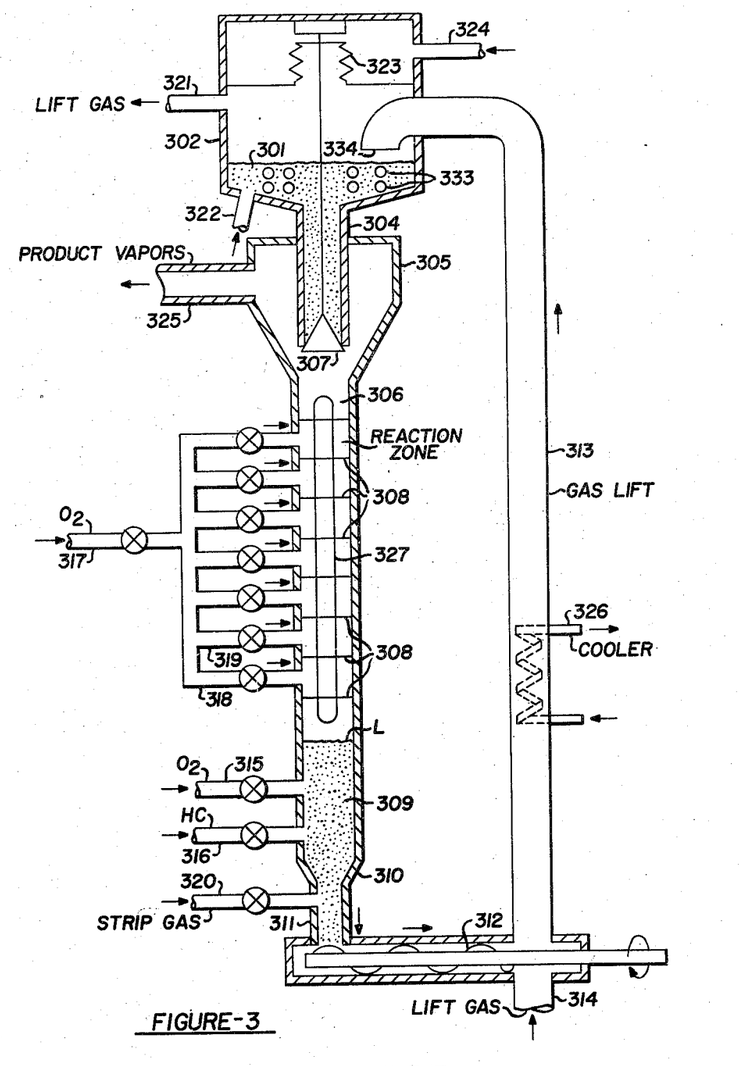

In the apparatus shown in Figure 3 a fluidized bed 301 is formed in the solids reservoir 302 at the top of the unit and heated or cooled by submerged heat exchange pipe or elements 333 to the desired initiating temperature, usually in the range of 280° to 350° C. The hot solid particles move into the upper solids standpipe 304 by gravity flow and the solids may be essentially non-aerated or in non-fluid state. The solids flow downwardly from this upper standpipe, past the disengaging zone 305, and enter the reaction chamber 306 through the conical solids flow valve 307.

In reaction chamber 306 the solids meet the countercurrently rising vapors comprising products of reaction and the reactant gas mixture. The solids fall freely except for a retarding action of horizontally positioned distributor screens or gratings 308, spaced apart vertically in the reaction chamber and transverse to the flow of the materials in the chamber. The distributor screens 308 may be constructed of suitable metallic material with suitable openings for passing the solid particles, e. g. 8-mesh stainless steel wire screening, extending over the entire chamber cross-section. The impingement and redistribu-

TABLE 5

*Production of carbon monoxide*

| Feed | Conventional | | | By Oxidation in "Raining" Reactor | | | | | | | |
|---|---|---|---|---|---|---|---|---|---|---|---|
| | Natural Gas | Fuel Oil | Coal | n-Hexane | | n-Butane | Cyclo-Hexane | Methyl-Cyclo-Hexane | n-Decane | SLVN* | n-Hexanol | n-Butanol |
| Run No | | | | H-67 | H-53 | | H-49 | | | | H-58 | |

Basis: 100 Pounds of Feed Converted to Gaseous and Water-Soluble Products (Organic Layer Products Recycled to Extinction)

| CO, Pounds | 254 | 190 | 150 | 38 | 50 | 72 | 64 | 91 | 46 | 76 | 62 | 124 |
| $CO_2$, Pounds | 23 | | | 12 | 13 | 21 | 17 | 36 | 17 | 41 | 16 | 28 |
| Olefins ($C_2$ and $C_3$), Pounds | 0 | 0 | 0 | 12 | 15 | 24 | 10 | 26 | 52 | 14 | 11 | 28 |
| Paraffins ($C_1$ and $C_2$), Pounds | 0 | 0 | 0 | 7 | 10 | 10 | 4 | 9 | 18 | 7 | 7 | 9 |
| Water Layer, Chemicals, Pounds | 0 | 0 | 0 | 73 | 75 | 66 | 52 | 65-75 | 32 | 62 | 47 | 34 |
| Oxygen Requirement, Pounds | 200 | 108 | 68 | 102 | 154 | 172 | 156 | 256 | 170 | 228 | 91 | 150 |

*SLVN=Light virgin naphtha, B. P. range 112 to 260° F.

tion of the falling solid particles effected by these screens or similar solids distributing means produces a uniform dispersion of the falling solids in the reaction chamber.

At the bottom of the reaction chamber 306 the solids fall into a shallow dense bed section 309 in which the gaseous hydrocarbon, with or without oxygen gas, flows upwardly. This small bed may or may not be in a highly fluidized condition depending on particle size, volume of the gases, density of the particles and rates of flow. The solids in bed 309 flow by gravity down through a stripping zone 310 into a lower solid standpipe 311, where the solids may be again in a relatively quiescent state.

A revolving motor-driven screw feeder 312 or other suitable device such as a pneumatic lift then transports the solid particles from the bottom of the lower standpipe 311 to the solids lift line 313. The solid particles are then lifted by a high velocity stream of air or other lift gas such as steam from line 314, through lift line 313 up to the solids reservoir 302. The lifted solid particles can be whirled out of the lifting gas stream by a tangential approach 334 to the cylindrical solids reservoir 302 to be separated from the gas so that they fall into the bed 301 below. The solid material thus completes a cycle in the reactor.

Cooler 326 shown in lift line 313 serves to remove the heat of reaction by cooling the solids to temperatures of about 280° to 350° C. This may be a tubular arrangement where the heat is picked up in pipes by steam, water, oil, etc. The hydrocarbon feed can be pre-heated and vaporized here, prior to introduction to reactor via line 316. Heat transfer elements 333 in chamber 301 can also be used for cooling, for once the reactor is operating the overall problem is one of rapid heat removal from the strongly exothermic reaction.

While the screw feeder 312 and the gas lift in line 313 are suitable for returning the particulate solids from vessel 310 to vessel 301, other well known arrangements, such as a mechanical lift, or bucket conveyor, can be used. Also it will be realized that the vaporous feed itself may serve as the lift gas, in which event it is introduced at 314, partially preheated in lift line 313 by contact with the solids, separated in 302, withdrawn through 321 and then fed into the reactor proper through line 316. Of course, if the feed serves as the lift gas, a portion of the same feed is also preferably used as the fluidizing gas injected at 322.

The reactant gases are supplied as shown. Oxygen or air enters from line 315, vaporous feed reactant enters from line 316. The resulting gas mixture, preferably containing a molar excess of the feed stock with relation to free oxygen present, travels up through the short bed section 309 into the relatively open space above the level L to meet the dispersed solid particles traveling downwardly through the open reaction chamber 306. The gases react in this relatively open space. Additional injections of oxygen are made at intervals along the length of the reaction chamber as through lines 317, 318 and 319. Portionwise injection of the organic feed at spaced intervals may also be used.

The introduction of the vaporous feed upstream from the oxygen is usually advantageous since it protects against passing through an explosive concentration range. Additional protection against explosion is derived from the fact that a hydrocarbon-oxygen mixture will not react to any substantial degree in a well fluidized dense bed of solids. Thus bed 309 acts as a carburetor for the reactant gas mixture and serves to homogenize and preheat the gases to a reaction initiating temperature.

The feed vapors are prevented from traveling downwardly with the granular solids by a rising stream of an inert stripping gas from inlet 320, e. g. nitrogen or steam. Automatic means may be used for controlling a supply of stripping gas in accordance with the pressure differential in the lower solid standpipe 311.

The lift gas is removed from the reservoir 302 by outlet 321. Fluidizing gas, e. g. air, or inert gas such as steam may be supplied through line 322 to the bed of solids at the bottom of the reservoir 302. Valve 307 may be controlled by various means such as the bellow arrangement 323 and gas pressure inlet 324 provided at the top of the reservoir.

The oxidation products substantially freed of solid particles in the disengaging zone 305 are withdrawn through outlet 325 to be passed to a products recovery unit of the type illustrated in Figure 2.

Visual observations of the reaction can be made through a glass window 327 fitted along the length of the reaction zone. When the reactions were properly controlled, a faint blue glow was observed in most instances. This light would occupy a short distance of about one to two inches shortly above an oxygen inlet and would be relatively cool. At the top edge of this visible zone a narrow band of high temperature could be detected by movable thermocouples. From the rate of flow of gases, and the length of the light band that was generated, the reaction period could be determined, e. g. of the order of 0.1 to 0.3 second. At the high temperature top boundary of the flame, temperatures as high as 100° to 130° C. above the temperature of the solids could be noted.

Figure 4:
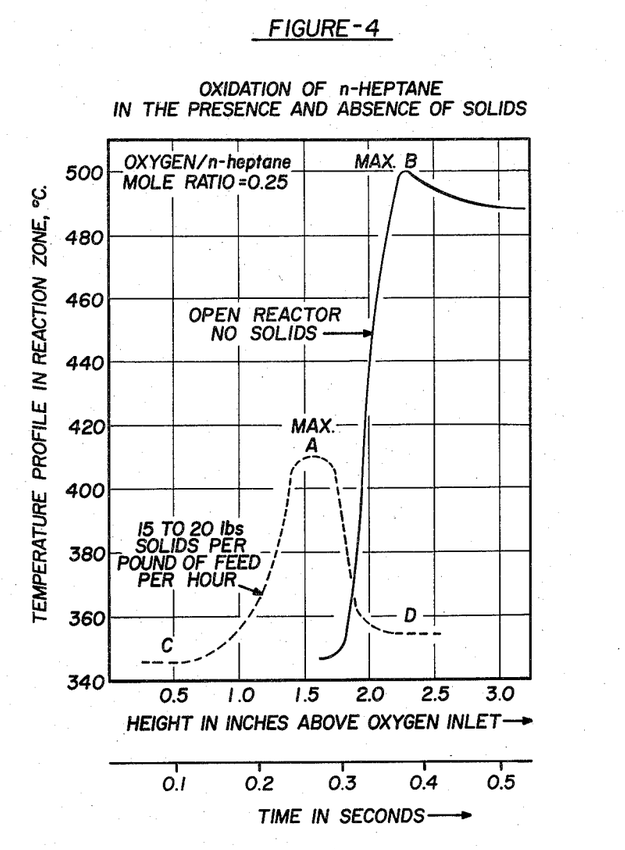
Figure 4 is a graphic representation showing the advantages of moderating an oxidation reaction by "raining" solids pursuant to this invention, as compared with a similar, unmoderated reaction.

The effectiveness of the solid particles in removing heat was shown by test runs wherein the solids were fed to reactor 306 at 300° C. and emerged from the reaction zone 0.2–0.5 second later at 370° C. As an illustration of the advantages of the dispersed or "raining" solids in controlling the reaction temperature, the data of the accompanying Figure 4 are presented. In the presence of solids in the form of fused alumina, size 125 to 150 microns, the maximum temperature measured for the oxygen-hydrocarbon ratio employed was 410° C. as shown by point A on Figure 4. If this temperature were corrected for radiation effects, then the true temperature would approach a maximum of 430° C. Further, it is to be noted that the temperature not only was controlled but was quickly brought down to the temperature of the solids in the reaction zone. The complete process of reaction and cooling required only a period of about 0.1 second. On the other hand, in the open tube and in the absence of solids, the maximum temperature measured was 500° C. as indicated by point B on Figure 4. If this latter temperature were corrected for radiation effects, then the true temperature would approach 600° C. and higher. Further, as the data show, the cooling process in the absence of solids required much more time than in the presence of solids.

Thus, the solids not only serve as good temperature control and heat removal means but, in addition, they prevent prolonged overheating and decomposition of the reaction products. Also, since the cooling time is fast in the presence of the dispersed solids, multiple injections of oxygen may be made at close intervals without any danger of excessive oxidation.

For the test carried out in the presence of solids, it should be noted that point D on Figure 4 corresponding to the temperature of the solids leaving the reaction zone, was only about 10° C. higher than point C which corresponds to the temperature of the solids entering the reaction zone. This demonstrates the effectiveness with which the liberated heat is removed from the reaction zone.

Countercurrent flow of solids to vapors as described above in connection with Figures 1 and 3 is normally preferred, since it gives a highly flexible process, with a high degree of control.

However, an arrangement wherein the flow of the dispersed solids and oxidizing vapors is actually cocurrent is also feasible within certain limitations and may have certain advantages, especially in the case of high boiling feeds. As already indicated, it is always important that the weight ratio of solids to vapors be high, such as 5 to 50 pounds of dispersed solids per pound of vapor per hour flowing through the reaction space; at the same time, because the solids are highly dispersed, the volume ratio of solids to vapors is very low, such as 1 to 10 and lower. That is, the gaseous or vaporous phase at all times comprises 90% or more by volume of the reaction space, with the volume of the particulate solids being 10% or less.

When the apparatus of Figure 3 is used for cocurrent flow, the operation will be essentially as follows. The dispersed solids leaving valve 307 flow downward under free fall conditions cocurrent with the organic feed vapors that enter via 325 and oxygen that enters via manifold lines 318, 319, etc. The temperature of these solids is controlled so as to be adequate to initiate the reaction between the vapors and the oxygen. This control of solids temperature is obtained by absorbing the exothermic heat of reaction in coolers 326 and 333, and preferably by additional cooling coils spaced in the main reaction space 306. For instance, grids 308 may be constructed to serve as cooling coils. Of course, the dispersed particulate solids, because of their number and high surface area, first absorb the reaction heat rapidly from the vapors. However, these solids eventually pass this heat to fluid coolers where it can be dissipated. In the case of cocurrent flow more cooling coil surface is usually required than in countercurrent flow, since in the former case the solids generally must be hotter when introduced.

The dispersed particulate solids rain through reaction space 306 under free fall conditions in those sections where no baffles or coils are present, and under hindered fall conditions as they flow past baffles or oxygen feed coils or cooling coils 308. Finally they collect in dense bed 309 at the bottom of the reaction zone, and below the point of product withdrawal. For instance, product vapors may be withdrawn via line 315, provided that the upper level L of the dense bed 309 is kept therebelow. The solids in bed 309 are kept fluidized so they will flow by means of fluidizing gas introduced through pipe 320. This gas may be some of the non-condensable reaction product, an inert gas such as nitrogen or steam, or it may be some of the vapors to be oxidized that otherwise would be fed in through line 325.

From the foot of the reactor the solids may be returned to the top bed 301 via conveyor 312 and lift pipe 313 in the manner described before, or in any other known manner. The lift gas introduced at 314 may be vaporizable liquid, such as steam or some of the feed, or it may be an inert gas such as nitrogen or some of the non-condensable product gases.

The gas velocities in reactor 306 are usually in the range of 0.5 to 5 feet per second, while that in the lift conduit 313 may be 5 to 20 feet per second.

Figures 5, 6:
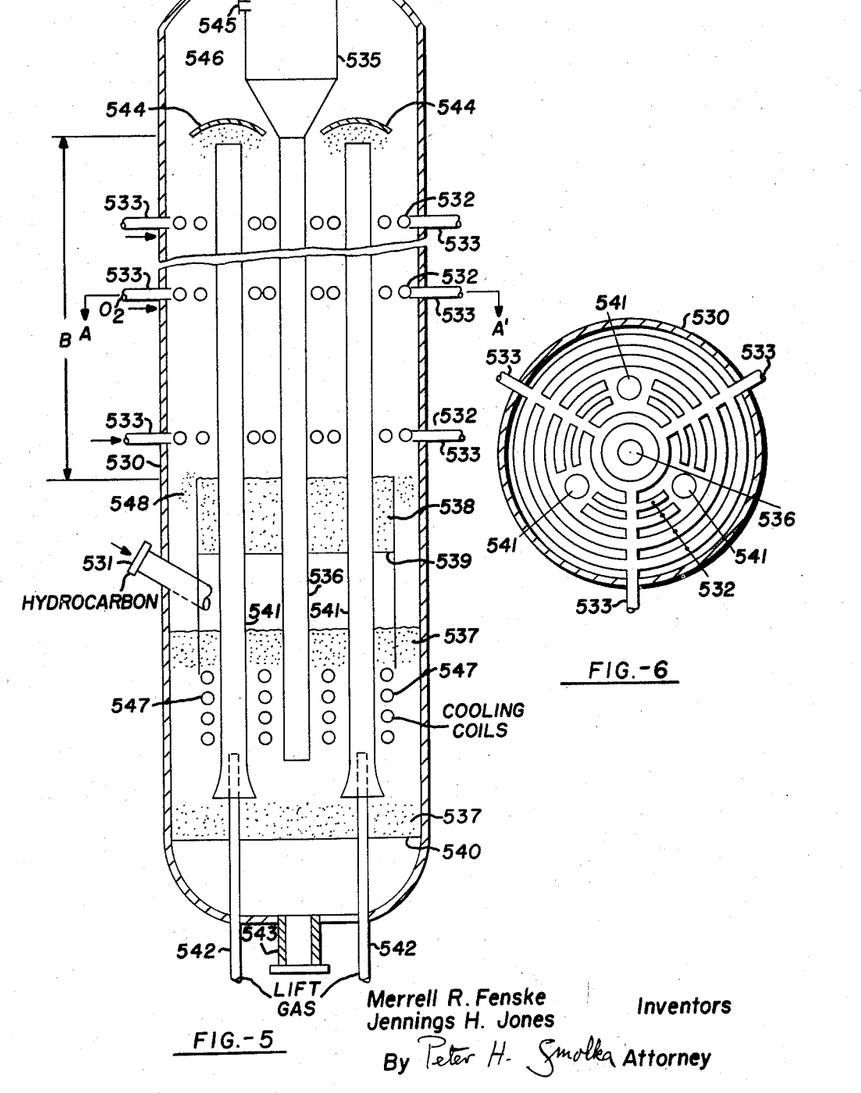

Still another apparatus suitable for this type of oxidation is illustrated in Figure 5. In this operation the dispersed "raining" solids are present and fall downward through the section designated as B. The feed to be oxidized enters the lower portion of reaction vessel 530 at 531, essentially in vaporous form. Unreacted feed and the reaction products leave at the top through 534. Oxygen or air, enters at 533, and several of these inlets are spaced along section B of the reactor.

Section A—A' shown in Fig. 6 is a cross section through the oxygen inlet grids 532 in Fig. 5, which correspond to grids 33 of Figure 1. These comprise a series of concentric pipes, as shown, which are perforated or slotted, preferably on the under side to provide openings so the oxygen can flow into the ascending stream of feed vapors. These grids serve to introduce oxygen in a well distributed form and simultaneously they insure that the "raining" solids are evenly distributed throughout the reactor.

Two dense beds of fluidized solids, 537 and 538, are positioned in the lower part of the reactor. The lower bed, 537, serves primarily to cool the solids, i. e. remove the heat of the partial oxidation reaction which the solids have assimilated in zone B. The cooling in bed 537 is accomplished by flowing coolant through pipes or coils 547. Bed 537 is only very gently fluidized to assure good heat transfer to coils 547 and to keep the solids mobile. Inert gas such as recycle waste gas is introduced for this purpose via nozzle 543 and flows up into the bed after passing through grid 540 which supports bed 537. This gas then passes up through bed 538 and zone B, to leave at 534.

Bed 538 serves to heat the hydrocarbon vapors to the desired reaction temperature, such as 300° to 400° C. In addition, it distributes the vaporous feed uniformly across the reactor. Oxygen or air can also be introduced into bed 538 by submerging inlet pipes 533 therein, in which case this bed serves as a carburetor.

The feed vapors leave the top of bed 538 and flow upward through zone B. Here they meet additional amounts of oxygen or air introduced through spaced grids 532.

The reaction products flow into space 546, and through openings 545 in cyclone 535 to leave via line 534 to a recovery system of the type shown in Figure 2.

The granular solids flow from the lower cooling bed 537 in a fluidized manner into the lift pipes 541 where they are transported upward by gas to the top of zone B. As the solids leave the top ends of lift pipes 541 they are deflected outward and downward by deflectors 544 which further aid in insuring an even distribution of the descending solids. These solids fall down through zone B where they contact the ascending reaction gases and remove from them the heat of reaction, then they collect in the dense fluidized bed 538 where they give up part of their heat to the relatively cool feed vapors passing up through bed 538 after being introduced at 531. The solids overflow bed 538 and fall down through conduits 548 and into lower fluidized bed 537 where additional cooling is accomplished as required. Some cooling of the solids can also be obtained during their rise through lift pipes 541, in which event the lift gas is introduced at 542 cool enough to do this. This lift gas raises or jets the solids from the dense bed 537 up through pipes 541 and separates from the solids in the vicinity of deflectors 544. It then passes through the cyclone and thence out through lines 534 along with the reaction products.

The lift gas introduced through nozzles 542 may be steam, part of the organic feed, a mixture of water and steam if extensive solids cooling in pipes 541 is desired, or some of the gaseous inerts from the process can be recycled for this purpose.

In a typical run where the overall oxygen to feed molal ratio is about 1 to 1, about one third of this oxygen is introduced in each of the oxygen grids 532. The temperature of bed 538 is about 375° C., and that of bed 537 about 300° C., which is also the temperature of the solids around deflectors 544. About 50 pounds of solids "rain" down through section B per pound of feed introduced at 531 and about 1 cubic foot of lift gas is used per pound of solids lifted.

Table 6 below shows the pronounced effect of solids rate on the reaction as reflected by solubility of organic layer products in concentrated sulfuric acid at room temperature. This solubility is a measure of the amount of olefins plus oxy-compounds that are in the hydrocarbon layer after the oxidation.

TABLE 6

Effect of dispersed solids rate

[Solids=fused Al₂O₃, 125–150 microns. Reactant=n-heptane; O₂/n-heptane mole ratio=0.55.]

| Solids Rate, Lbs./Liter n-Heptane/Hr | 36 | 124 |
|---|---|---|
| Solubility of Organic Layer in H₂SO₄, Vol. percent | 30 | 24.5 |
| Wt. percent of Feed to Water Layer | 15.7 | 17.1 |

Other solids, e. g. sand and glass beads, similarly showed peak performance for recovery of oil layer products, mainly olefins and epoxides, for solid rates in the range of about 10 to 100 lbs. per liter of hydrocarbon fresh feed/per hr. Thus, considering the densities of the hydrocarbon liquid feed, the solid rates should be about 5 to 50 lbs. solid/1 lb. of feed.

Table 7 illustrates how the best operation is obtained by keeping the temperature of reaction principally between 300 and 400° C.

TABLE 7

Effect of temperature

[Solids=300 microns glass and fused Al₂O₃. O₂/n-heptane mole ratio=0.6. Solids rate for all tests—25 lbs./lb. heptane/hr.]

| Products, Wt. Percent of Feed | Temperature, °C. | | |
|---|---|---|---|
|  | 300° | 345° | 395° |
| Oil Layer | 86.1 | 86.6 | 84.6 |
| Gas, as C and H only | 7.5 | 9.1 | 11.2 |
| Water Layer | 15.7 | 16.7 | 14.7 |

Table 7 indicates that the use of low temperatures of about 280° to 350° C. is favorable for producing liquid products, rather than gaseous products. However, such temperatures cannot normally be maintained in an "open" reactor, i. e. one not containing granular solids, since temperatures tend to rise spontaneously to 500° to 600° C. due to the heat of reaction. This then causes undesirable burning and excessive degradation to low molecular weight products, unless counteracted by the technique of the present invention.

The advantages and improvements in liquid product yield resulting from multiple injection of oxygen, in amounts ranging from about 0.1 to 0.5 mole of oxygen per injection per mole of hydrocarbon feed, are shown in Table 8.

TABLE 8

Effect of multiple oxygen injection

| Hydrocarbon Feed | n-Heptane | | | | A | |
|---|---|---|---|---|---|---|
| No. of Oxygen Inlets | 3 | 5 | 3 | 5 | 1 | 2 |
| Oxygen/HC Mole Ratio | 0.65 | 0.65 | 0.62 | 0.62 | 0.5 | 0.5 |
| Solids | 600 Micron Glass Beads | | 250–700 Micron Sand | | 600 Micron Glass Beads | |
| Solids Rate, lbs./lb. F. F./hr | 25 | 25 | 25 | 25 | 18 | 18 |
| Wt. Percent Feed as HC Layer | 80 | 85 | 83 | 88 | 81 | 86 |
| Wt. Percent Feed as C and H in Gas | 11 | 8 | 7 |  | 9 | 8 |
| Wt. Percent Feed as Water Layer | 16 | 16 | 14 | 16 | 15 | 13 |
| Sol. of HC Layer in H₂SO₄, Percent | 30 | 30 | 26 | 29 | 29 | 32 |

A=Texas Light Virgin Naphtha of 160 to 220° F. boiling range point.

Table 9 illustrates the application of the invention to upgrading the octane number of virgin naphthas. As seen, the conversion of hydrocarbon exceeds 50%; yet the temperatures were well controlled so as not to exceed 410° C., even though the total of 1 mole of oxygen was used per mole of feed.

TABLE 9

Upgrading naphthas in octane number

| Feed | Naphtha A | Naphtha B |
|---|---|---|
| Experiment No | Feed 1 | Feed 2 |
| Oxygen/Hydrocarbon Mole Ratio | 0.95 | 1.0 |
| No. of Points of Oxygen Injection | 3 | 3 |
| Solids | Fused Alumina | Fused Alumina |
| Temperature of Solids at Inlet (Top), °C | 330 | 330 |
| Temperature of Solids at Exit (Bottom), °C | 370 | 370 |
| Maximum Temp. in Reaction Zone, °C | 410 | 410 |
| Pounds of Solids/Pound Feed/Hour | 15 to 20 | 15 to 20 |
| Percent Hydrocarbon Conversion | 54 | 57 |
| Percent Oxygen Conversion | 97 | 97 |
| Wt. Percent Feed Recovered as C and H in non-condensing Gas | 9.7 | 8.3 |
| Wt. Percent Feed Recovered as Liquid Products [1] | 92.0 | 95.2 |
| Vol. Percent Feed Recovered as Liquid Products [1] | 86.0 | 90.0 |
| Octane No. of Liquid Products, research, clear | 67 / 88.0 | 49.6 / 80.0 |
| Octane No. of Liquid Products, research, +1.5 ml./gal. of Tetraethyllead | 79.5 / 95.3 | 60.7 / 85.0 |

[1] Combined hydrocarbon layer product after light hydrofining, plus organic material separated from water layer after hydrogenation of water layer.

(A) Light virgin naphtha of 112° to 260° F. boiling range from Canadian crude.

(B) Virgin naphtha of 200° to 330° F. boiling range from Texas crude.

To summarize, the main advantages of this invention include:

(a) The solids, when used in the manner and proportions indicated, rapidly remove the reaction heat from the hottest parts of the reaction zone without poisoning the main reaction or causing excessive degradation due to backmixing and resulting secondary reactions;

(b) The highly dispersed, "raining" solids permit the construction of reactors of economical size for commerical use in refineries for the upgrading of the octane number of naphthas independent of any catalytic action;

(c) Careful control of temperature is made possible and thus minimizes wasteful carbon-carbon fission;

(d) When the solids and reactants flow countercurrently, it is possible to feed relatively cool solids, even at temperatures cooler than necessary for initiation of the reaction, and to remove the reaction heat in a progressive manner;

(e) Superatmospheric pressure can be used in the reaction chamber to facilitate the reaction as well as the subsequent recovery of the products, or subatmospheric pressure can be used to facilitate vaporization of high boiling feeds;

(f) Since no reaction occurs in a well fluidized dense bed of solids, the dense bed of solids at the bottom of the reactor is an excellent carburetor for mixing the organic vapors with oxygen and for bringing them to the proper reaction conditions;

(g) Very reactive materials such as octene, cetane, or aldehydes, can now be oxidized selectively to epoxides and olefinic compounds whereas no similarly effective conversion thereof was possible by previous methods;

(h) Because the heat of reaction can be removed so readily, relatively large proportions of oxygen to hydrocarbon can be used without losing control of the reaction and thus high conversions can be attained in short contact times and in small equipment.

In addition to the types of reactions described, the process of the present invention may be useful with other types of temperature sensitive vapor phase reactions, especially of the exothermic type. Among such reactions are halogenations, such as chlorinations of propane or butane, oxidations of methane and aromatics using gaseous oxygen carriers such as nitrogen tetraoxide, sulfurizations such as reactions involving gaseous sulfur and hydrocarbons, and reactions involving acetylene.

While a uniform chemical type of inert solids is of good utility for the heat removal which is an essential characteristic of this invention, sometimes there may be advantages in using a catalytic solid which additionally accomplishes rearrangement, isomerization, dehydration, or dehydrogenation of certain of the products formed in the reaction. In such a case the catalytic solids may be used either in a concentrated form or diluted with inert solids for better heat removal. Further, as an example, it may at times be desirable to use an oxygen-generating solid such as ferric or copper oxide. In such a case the oxide may be diluted with an inert solid so as to adjust the oxygen supply to the desired value, and at the same time attain the desired heat absorption.

What is claimed is:

1. In a process for making normally liquid organic oxycompounds by homogeneous noncatalytic oxidation of an organic substance boiling up to 450° C., said organic substance being selected from the group consisting of hydrocarbons and compounds containing only carbon, hydrogen and oxygen and which contain at least 30% of its carbon atoms in the form of methylenic groups, the improvement which comprises mixing said organic substance in vapor form with an oxygen-containing gas, passing the mixture upwardly through a reaction zone at a linear velocity of about 0.5 to 5.0 feet per second and at reaction temperatures from about 300 to 500° C. and pressures from about 0.01 to 15 atmospheres, also passing downwardly through the reaction zone in substantially a free-fall condition relatively cool finely divided solids essentially inert toward the gaseous reagents and evenly dispersed throughout the reaction zone in a concentration of about 0.01 to 0.1 volume of solid per volume of gas and at a rate of about 2 to 100 pounds of solid per pound of vaporous reaction mixture and capable of absorbing a substantial part of the reaction heat, and removing oxidation reaction products from the reaction zone.

2. The process of claim 1 wherein said organic substance is a hydrocarbon having up to 18 carbon atoms per molecule, the reaction temperatures are in the range of 300 to 475° C., the pressures are in the range of 0 to 200 p. s. i. g., and the solids rate is about 5 to 50 pounds per pound of the hydrocarbon feed in the reaction zone.

3. The process of claim 1 wherein said organic substance is selected from the group consisting of alkanes, cycloalkanes and alkanols; the solids being introduced into the reaction zone substantially at initiation temperature.

4. The process of claim 1 where at least one mole of oxygen is consumed per mole of organic feed reacted, but where the oxygen gas is injected in stages so that local mole ratios of free oxygen to oxidizable feed are not in excess of 0.5.

5. The process of claim 1 where the solids are selected from the group consisting of quartz, sand, fused alumina, and dense coke.

6. The process of claim 1 where the mole ratio of oxygen to feed is between 0.5 and 2.5, wherein the reaction temperature is maintained below 450° C., the feed conversion per pass is kept below 60%, and the ratio of solids to gas in the reaction zone is between about 5 to 50 pounds per pound, so that a large proportion of oxidized compounds is produced which contains the same number of carbon atoms per molecule as the feed.

7. In a partial oxidation of a reactive $C_5$ to $C_{18}$ methylenic hydrocarbon by reaction with oxygen, the improvement which comprises introducing the hydrocarbon at least partially in liquid phase into a dense fluidized bed of solid particles which are inert with respect to the hydrocarbon and are maintained at a temperature in the range of 280° to 400° C. in the lower portion of a reaction zone, vaporizing the hydrocarbon in said fluidized bed and passing the vaporized hydrocarbon from said bed upwardly through the reaction zone, injecting oxygen-containing gas into the reaction zone at at least one point above said bed in an amount adjusted to form a reaction mixture having a local admixed oxygen-to-hydrocarbon molal ratio not above 0.5, passing a portion of the solid particles from said bed through a separate lift zone to the top of the reaction zone independently of said reaction mixture, scattering the solids evenly and downwardly through the reaction mixture in substantially a free-fall condition at a rate of about 5 to 50 lbs. solid per lb. of ascending hydrocarbon, removing heat of reaction from solid particles outside the reaction zone, and withdrawing resulting partial oxidation products in vapor form from an upper portion of the reaction zone.

8. The process of claim 7 wherein the reaction product is separated into a gas fraction, an aqueous layer and an organic liquid layer, the latter is further separated into an oxidized product fraction and a fraction rich in unconverted feed, and at least a portion of the latter is recycled to the conversion zone for further oxidation.

9. The process as described in claim 7, wherein part of the oxygen to be used for the reaction is admixed with the hydrocarbon reactant in the dense phase of solid particles and additional amounts of oxygen are added at vertically spaced points in the reaction zone, the total amount of oxygen added being within the range of 0.5 to 2.5 moles per mole of hydrocarbon.

10. A process according to claim 7 wherein the solids are lifted through said lift zone from said dense bed to the top of the reaction zone by vaporized hydrocarbon feed which is separated from the solids at the top of the reaction zone and returned externally to a lower portion of the reaction zone.

References Cited in the file of this patent

UNITED STATES PATENTS

| | | |
|---|---|---|
| 2,459,836 | Murphree | Jan. 25, 1949 |
| 2,475,605 | Prutton et al. | July 12, 1949 |
| 2,503,291 | Odell | Apr. 11, 1950 |
| 2,561,420 | Schutte | July 24, 1951 |
| 2,604,479 | Rollman | July 22, 1952 |
| 2,684,927 | Bergstrom | July 27, 1954 |
| 2,727,810 | Leffer | Dec. 20, 1955 |
| 2,752,407 | Cahn | June 26, 1956 |